US012541628B2

(12) United States Patent
McDonley et al.

(10) Patent No.: US 12,541,628 B2
(45) Date of Patent: Feb. 3, 2026

(54) DIGITAL CIRCUIT REPRESENTATION USING A SPATIALLY RESOLVED NETLIST

(71) Applicant: Battelle Memorial Institute, Columbus, OH (US)

(72) Inventors: Timothy A. McDonley, Grove City, OH (US); Andrew Elliott, Columbus, OH (US); Adam Kimura, Lewis Center, OH (US); Katie T. Liszewski, Powell, OH (US); Thomas Kent, Columbus, OH (US); Josh Delozier, Columbus, OH (US); Benjamin Hayden, North Canton, OH (US)

(73) Assignee: Battelle Memorial Institute, Columbus, OH (US)

( * ) Notice: Subject to any disclaimer, the term of this patent is extended or adjusted under 35 U.S.C. 154(b) by 790 days.

(21) Appl. No.: 17/817,904

(22) Filed: Aug. 5, 2022

(65) Prior Publication Data
US 2023/0044517 A1 Feb. 9, 2023

Related U.S. Application Data

(60) Provisional application No. 63/230,329, filed on Aug. 6, 2021.

(51) Int. Cl.
*G06F 30/327* (2020.01)
*G06F 30/30* (2020.01)
*G06F 30/337* (2020.01)
(52) U.S. Cl.
CPC .......... *G06F 30/327* (2020.01); *G06F 30/337* (2020.01)

(58) Field of Classification Search
None
See application file for complete search history.

(56) References Cited

U.S. PATENT DOCUMENTS

| | | | |
|---|---|---|---|
| 7,580,557 B2 | 8/2009 | Zavadsky et al. | |
| 7,890,914 B2* | 2/2011 | Jensen | G06F 30/30 716/120 |
| 9,367,659 B2* | 6/2016 | Saghizadeh | G06F 30/36 |
| 10,565,344 B1 | 2/2020 | Lagnese | |
| 10,783,311 B2 | 9/2020 | Studders | |

(Continued)

FOREIGN PATENT DOCUMENTS

CN 110263608 A 9/2019

OTHER PUBLICATIONS

International Search Report and Written Opinion of related International Application No. PCT/US2022/035645, mail date Sep. 7, 2023, 9 pages.

(Continued)

*Primary Examiner* — Leigh M Garbowski
(74) *Attorney, Agent, or Firm* — Grossman, Tucker, Perreault & Pfleger, PLLC; Edmund P. Pfleger

(57) ABSTRACT

The present disclosure provides a method for generating a spatially resolved netlist that includes generating a netlist based on integrated circuit (IC) layout data and standard cell library data, the netlist including cell and net definitions associated with the IC; determining position data for respective cells and nets based on the IC layout data; mapping the position data to respective cell and net definitions in the netlist; and generating a spatially resolved netlist that includes the mapped position data to respective cell and net definitions.

18 Claims, 6 Drawing Sheets

(56) References Cited

U.S. PATENT DOCUMENTS

| | | | |
|---|---|---|---|
| 12,235,959 | B1 | 2/2025 | Tahranjpoor et al. |
| 2005/0278667 | A1 | 12/2005 | Boucher et al. |
| 2006/0045325 | A1 | 3/2006 | Zavadsky et al. |
| 2012/0086432 | A1 | 4/2012 | Noell |
| 2013/0024827 | A1 | 1/2013 | McIlrath |
| 2013/0125071 | A1 | 5/2013 | Matsuzaki |
| 2013/0163851 | A1 | 6/2013 | Dalla-Torre et al. |
| 2013/0326438 | A1 | 12/2013 | Lee et al. |
| 2013/0336575 | A1 | 12/2013 | Dalla-Torre et al. |
| 2016/0197616 | A1 | 7/2016 | Cocchi et al. |
| 2017/0004240 | A1* | 1/2017 | Rashingkar ........... G06F 30/392 |
| 2017/0074927 | A1 | 3/2017 | Cignac |
| 2017/0323439 | A1 | 11/2017 | Sandberg et al. |
| 2018/0040631 | A1 | 2/2018 | Kim et al. |
| 2020/0356011 | A1 | 11/2020 | Su et al. |
| 2021/0034805 | A1 | 2/2021 | Woodard et al. |
| 2021/0081509 | A1 | 3/2021 | Salik et al. |
| 2021/0390236 | A1 | 12/2021 | Jin et al. |
| 2022/0130031 | A1 | 4/2022 | Woodard et al. |
| 2022/0245318 | A1* | 8/2022 | Chen ..................... G06F 30/327 |
| 2022/0350950 | A1 | 11/2022 | Choi et al. |

OTHER PUBLICATIONS

Asadi et al., "Special Issue: 2019 PAINE Conference—Physical Assurance and Inspection of Electronics", Journal of Hardware and Systems Security, Feb. 11, 2020.

Non Final Office Action of related U.S. Appl. No. 17/854,029, mail date May 8, 2025, 19 pages.

Josh Delozier, Third-Party IP Verification and Validation for Post-Silicon Recovered Designs, Research was sponsored by the Air Force Lab contract FA8650-23-C-1000 as part of the OUSD Trusted and Assured Microelectronics Program.

Noah Taylor et al., Functional Model Recovery from Transistor Networks for Unknown Cell Identification, Research sponsored by the Air Force Research Lab contract as part of the OUSD Trusted and Assured Microelectronics Proram.

Kimura et al., A Decomposition Workflow for Integrated Circuit Verification and Validation, Journal of Hardware and Systems Security, Jan. 2, 2020, Springer Nature, 12 pages.

\* cited by examiner

DIGITAL CIRCUIT REPRESENTATION USING A SPATIALLY RESOLVED NETLIST

This application claims the benefit of U.S. Provisional Application Ser. No. 63/230,329, filed Aug. 6, 2021, which is hereby incorporated by reference in its entirety.

STATEMENT OF GOVERNMENT INTEREST

This invention was made with government support under contract number FA8650-15-D-1953, awarded by The Air Force Research Lab. The government has certain rights in the invention.

TECHNICAL FIELD

The present disclosure relates to digital circuit representation using a spatially resolved netlist.

BACKGROUND

The trend of utilizing offshore foundries for chip fabrication to improve profit margins has introduced new vulnerabilities into the manufacturing process. The lack of visibility into the supply chain necessitates efforts to provide post-silicon assurance and techniques to mitigate potentially catastrophic fallout from using compromised ICs. A primary method of assessment is the extraction of the as-fabricated design files from the manufactured chip and performing subsequent verification and validation (V&V) against the original golden reference designs. The layout recovered from this process is flat and requires a methodology for restoring the cell level hierarchy in order to generate a netlist that can be used to perform a more in-depth security analysis or assurance assessment. In other scenarios, the original design files and libraries may be missing or not available. This creates additional challenges when trying to identify cells and boundaries for reconstructing the design hierarchy and generating the as-fabricated netlist. A manufactured chip is removed from the packaging and delayered to expose the metal and via features for each target layer. These are imaged and polygons are extracted producing a reconstructed GDSII layout for comparison. When recovering the as-fabricated layout, the image processing and polygon extraction processes used to produce the initial transistor level layout does not perfectly match to the "golden" GDSII layout. This is largely due to modifications from the fabrication process (e.g., optical proximity corrections) and artifacts introduced through the sample preparation, imaging, and extraction processes. This requires a methodology that utilizes both behavioral (i.e., Boolean satisfiability) and topological connectivity (i.e., graph theory) to differentiate error artifacts from intentional malicious changes. The post-silicon verification and validation of an unassured chip could have different levels of access to the original cell design files and libraries used in the golden design, thus requiring a process with flexible inputs. In addition, as node sizes shrink, these issues compound and necessitate a behavioral as well as spatial comparison to differentiate errors from true changes.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

FIG. 1A illustrates an example spatially resolved netlist according to one embodiment of the present disclosure;

Although the following Detailed Description will proceed with reference being made to illustrative embodiments, many alternatives, modifications and variations thereof will be apparent to those skilled in the art.

DETAILED DESCRIPTION

This disclosure provides a novel digital circuit representation, combining both logical and physical characteristics of a design into a graphical representation of a circuit design layout. This graphical representation, referred to herein as a "spatially resolved netlist", is useful for hardware trust analysis of both fabricated and pre-fabrication integrated circuit designs. The spatially resolved netlist of the present disclosure may be used to augment existing netlist analysis tools by integrating information about the physical structure of a design. The teachings herein include the data qualities of a spatially resolved netlist, as well as the process of generating a spatially resolved netlist, and several analyses than can be performed using a spatially resolved netlist. The process of generating spatially resolved netlists may be used in conjunction with existing integrated circuit (IC) imaging, netlist extraction, and decompilation flow. The spatially resolved netlist of the present disclosure may be used for circuit design and analysis, and such analysis may be fed back into imaging, netlist extraction, and netlist decompilation operations to further improve their accuracy. Additionally, using the spatially resolved netlist of the present disclosure that combines logical and spatial information may provide for several new types of analyses to be performed that would not otherwise be possible on either a purely logical or purely spatial representation of a design.

Figure 1:
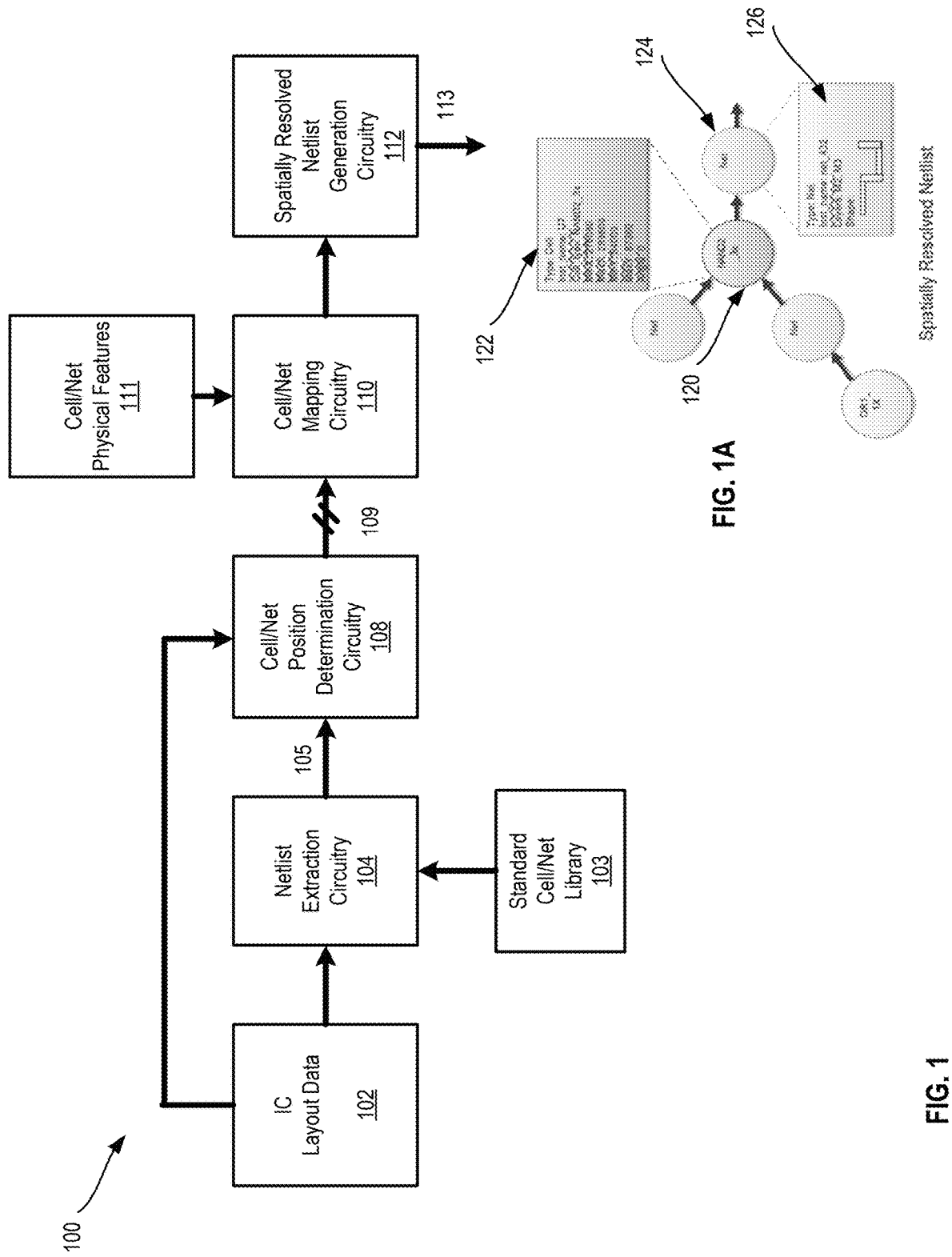
FIG. 1 illustrates a system to generate a spatially resolved netlist according to several embodiments of the present disclosure.

FIG. 1 illustrates a system 100 to generate a spatially resolved netlist according to several embodiments of the present disclosure. In these embodiments, the system 100 is directed to generating a spatially resolved netlist in the context of a pre-fabrication design stage of an integrated circuit (IC). As used herein, a "spatially resolved netlist" is a netlist that includes physical location information mapped to netlist definitions nodes (cells and nets) of a circuit design of an IC. The physical location of cells and nets, extracted from IC layout data, may be defined in terms of x-y coordinates of the layout, and may also include information regarding cells and nets that span multiple layers of an IC. In addition, physical information of cells and nets may also be mapped to netlist definitions of nodes (cells and nets). The spatially resolved netlist may be displayed to allow designers to view netlist and physical information regarding each node as well as the physical position of each cell and net as they are defined in an IC layout.

A "cell", as used herein, represents a logic circuit (e.g., AND, OR, NOT, NAND, NOR, etc.) and/or a collection of such circuits. As is understood, each cell typically is formed of a plurality circuit elements (e.g., transistors, resistors, capacitors, etc.). The spatially resolved netlist includes information about each cell ("cell information"). Cell information may be represented as a plurality of data fields to specify information about the physical structure of the cell (e.g., electrical characteristics of the logic circuit element), the size and shape of the cell (e.g., physical location in 2D or 3D space, etc.), and may also include unique identifying information of a cell (e.g., unique label, etc.), layer information, etc. A "net", as used herein, represents a wire link instance between cells (e.g. an IC circuit trace segment between cells, using inputs and outputs of each cell). The spatially resolved netlist includes information about each net ("net information"). Net information may be represented as a plurality of data fields to specify information about, the size and/or shape of the net, electrical properties of the net, physical layout of the net, the net structure through multiple layers of the IC, etc. The collection of cells, cell information for each cell, nets, and net information for each net provides both logical and physical characteristics of a circuit design.

The system 100 includes netlist extraction circuitry 104 generally configured to generate a netlist 105 using the original IC layout data 102 and a standard cell/net library 103. The netlist extraction circuitry 104 maps each cell instance of the IC layout data to a netlist definition for each respective cell. The netlist 105 may be generated, for example, using conventional and/or proprietary netlist generation tools such as Pix2Net, etc., and the netlist 105 generally includes a description of the connectivity of the cells of the IC, and a list of connections between cells (nodes). As is understood in the art, the definition of each cell instance in the netlist 105 generally includes physical connection information between nodes and/or logical information between nodes. Additionally or alternatively, the netlist 105 may be generated to include instance-based information (i.e., clustered about a cell or cell) and/or net-based (e.g., an exhaustive list of connections to a particular cell), and either can be "flat" (where all connections are shown) or hierarchical (where connections may be grouped, such as by IC layer, etc.). The netlist 105 may also include electrical information concerning a cell (and/or circuit elements of cell), for example, circuit type definitions (e.g., AND, OR, NOT, etc.) along with registers, input/output ports, etc.

The original IC layout data 102 may be generated using conventional and/or proprietary circuit design tools, and may be formatted in a conventional and/or proprietary data format, for example, GDS, GDSII, etc. The original IC layout data 102, as is known, generally defines the placement of cells and nets on each layer of the IC (which may include placement of parts of a cell and/or net on more than one layer of the IC), and the cells and nets are represented as a collection of polygon shapes (to be used as semiconductor masking in a fabrication process phase). The collection of polygon shapes is used to form the standard cell library 103, such that each cell and net used in the IC design is defined in the standard cell library 103. As is understood, while the original IC layout data 102 typically illustrates cell/net placement for a given layer, such a format offers little to designers for circuit analysis, vulnerability analysis, etc. Similarly, a traditional netlist 105 does not provide a designer with layout information, and thus, is limited in terms of ability for designers to investigate circuit analysis, vulnerability analysis, etc.

Accordingly, the system 100 also includes cell/net position determination circuitry 108 generally configured to determine, for a given layer, positional data 109 for each cell and each net in that layer. The positional data 109 may be derived from the IC layout data 102, for example, as may be defined in GDS and/or GDSII circuit design data. The positional data 109 may include, for example, x-y positional data with respect to a layer grid, etc. Thus, for example, a cell and/or net may be defined by an x span (for example, in pixels, etc.) and a y span relative to a grid of a layer of the IC design. In addition, for cells and/or nets that span multiple layers, the positional data 109 may be linked across multiple layers so that the positional data 109 reflects the entirety of a cell/net link across multiple layers.

The system 100 also includes cell/net mapping circuitry 110 generally configured to map cell/net positional information 109 to respective cell/net definitions in the netlist 105. The cell/net mapping circuitry 110, in some embodiments, is also configured to map cell/net physical features 111 (e.g., physical information regarding a cell or net including, for example, shape, size, width, length, electrical characteristics, etc.) to respective cell/net definitions in the netlist 105. The system 100 also includes spatially resolved netlist generation circuitry 112 to generate a spatially resolved netlist 113 that includes cell/net positional information in the IC layout and cell/net physical features (cell/net information). The spatially resolved netlist 113 may be display (using a computer display system, not show) to provide designers with both IC layout information and feature information regarding cells and nets. FIG. 1A (inset) illustrates an example of part of a spatially resolved netlist 113 according to the teachings herein. In FIG. 1A, an example cell 120 and cell information 122 are illustrated. In this example, the cell 120 is a logic NAND gate circuit element. The cell information 122, corresponding to cell 122, includes information about the cell type, electrical characteristics, and cell position. For example, as illustrated, the cell information 122 includes data fields to specify that cell 120 is a NAND logic gate, as well as positional data of the cell 120. In this example, the positional data is represented as min/max x and min/max y data fields to represent a 2-dimensional position of the cell 120 within a larger layer of an integrated circuit. In addition, the cell information 122 may include data fields such as angle, mirror (not shown), etc. to represent additional position data of the cell 120 (for example, the angle may represent an offset from an XY coordinate system of a layer of an integrated circuit).

FIG. 1A also illustrates an example net 124 and net information 126. In this example, the net 124 is a wire trace output path of cell 120. The net information 126, corresponding to net 124, may include data fields to specify information about the identity of the net, net shape, and layer information associated with the net. In this example, the net 124 is associated with layers M2 and M3, and has a shape as illustrated in net information 126.

Figure 2:
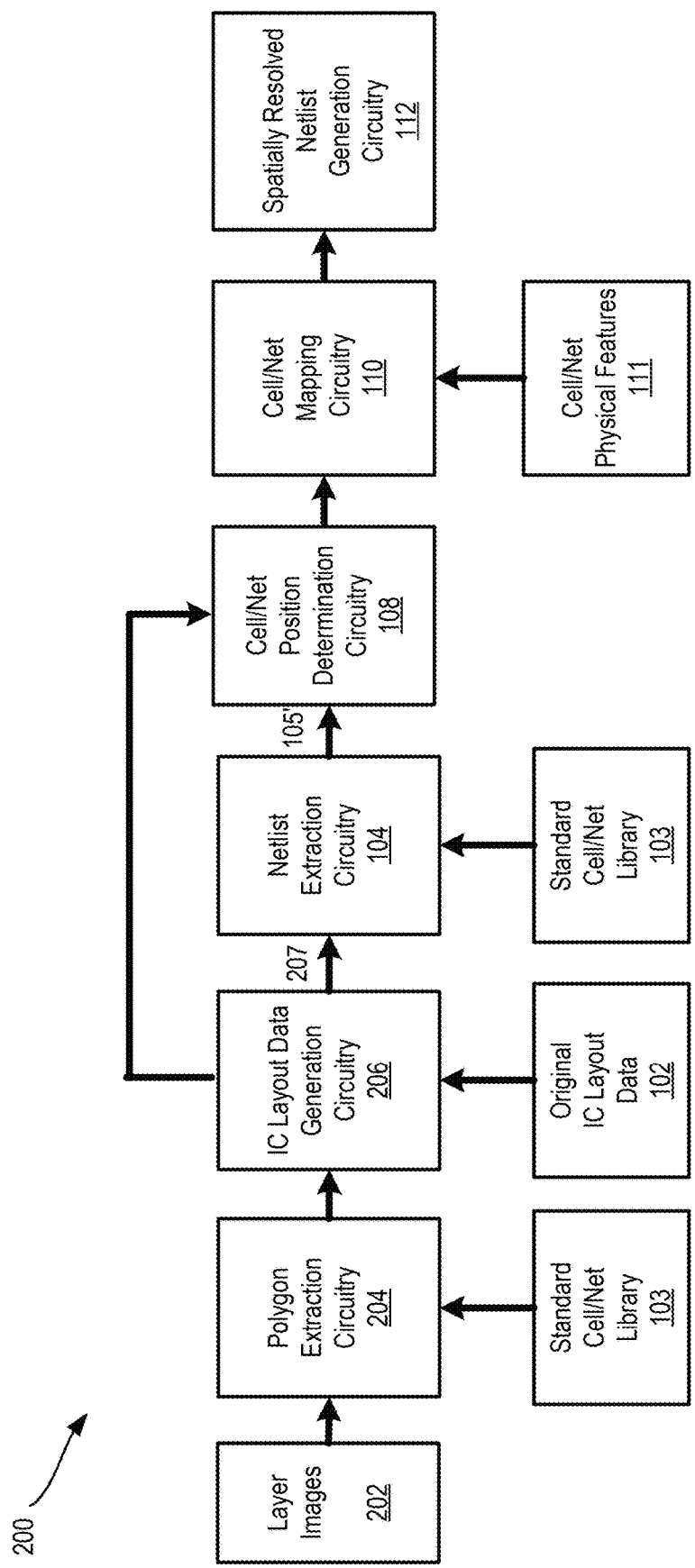
FIG. 2 illustrates another system to generate a spatially resolved netlist according to several other embodiments of the present disclosure.

FIG. 2 illustrates a system 200 to generate a spatially resolved netlist according to several other embodiments of the present disclosure. In these embodiments, the system 200 is directed to generating a spatially resolved netlist in the context of post-fabrication an integrated circuit (IC). This embodiment includes polygon extraction circuitry 204 to identify cells and nets (each defined as a collection of polygons) within layer images of an IC 202 and based on the standard cell/net library 103 that is used during the design of the IC (prefabrication). The polygon extraction circuitry 204 may identify polygons in a layer image file using known and/or proprietary polygon extraction techniques such as machine vision techniques. The system 200 also includes IC layout generation circuitry 206 generally configured to generate as-fabricated layout data 207 based on the identified cells and nets, and their respective positions within each layer. The as-fabricated IC layout data may be formatted into a standardized database file structure such as a GDS, GDSII, etc. type file structure (and such a file structure may provide shape-based and/or vector-based information about each polygon). In some embodiments, the as-fabricated IC layout data 207 may be compared with the original IC layout data 102 to determine, for example, fabrication errors, etc.

The system 200 includes netlist extraction circuitry 104 generally configured to generate an as-fabricated netlist 105 using the as-fabricated IC layout data 207 and the standard cell/net library 103. The netlist 105 may be generated, for example, using conventional and/or proprietary netlist generation tools such as Pix2Net, etc., and the netlist 105 generally includes circuit definitions (e.g., AND, OR, NOT, etc.) along with registers, input/output ports, etc. (and may also define connections between cells and nets). As with the previous embodiments of FIG. 1, the system 200 also includes cell/net position determination circuitry 108, cell/net mapping circuitry 110 and spatially resolved netlist generation circuitry 112, each operating in a similar manner as described above in FIG. 1.

Figure 3A:
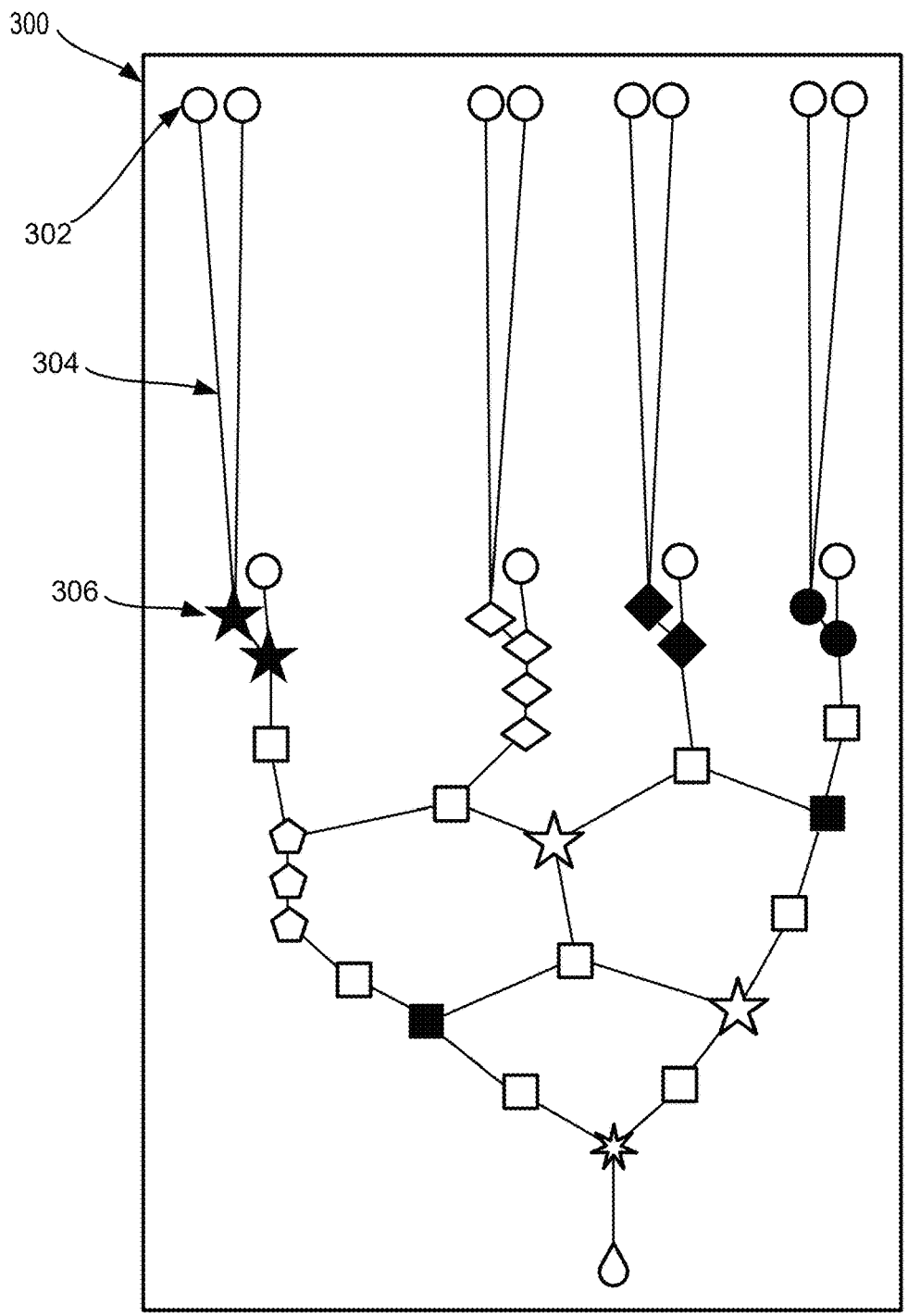
FIGS. 3A and 3B illustrate examples of spatially resolved netlists according to embodiments of the present disclosure.
Figure 3B:
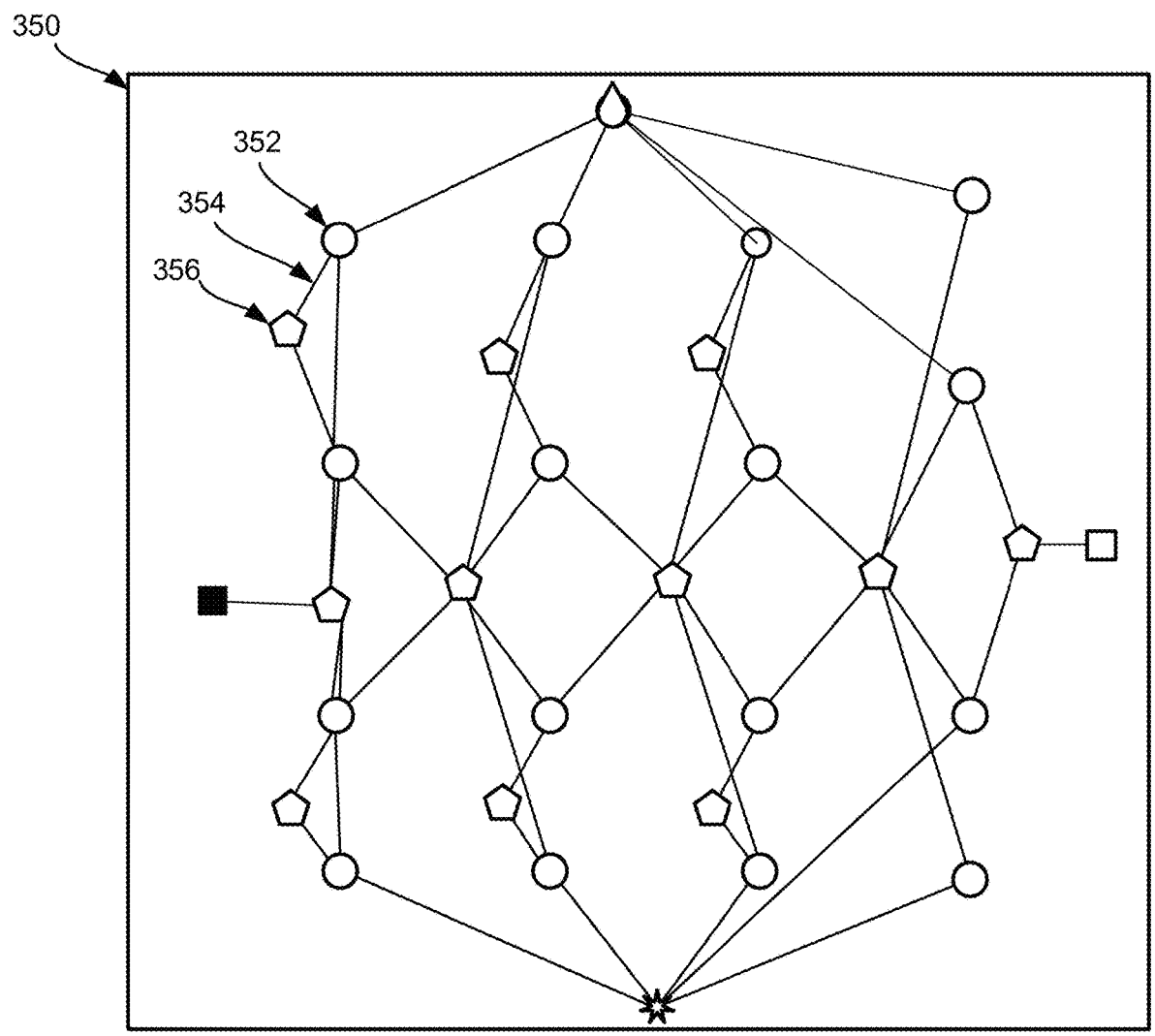

FIGS. 3A and 3B illustrate additional example of portions of a spatially resolved netlist. In FIG. 3A, the spatially resolved netlist 300 is illustrated as displaying cells (e.g., cell 302 and 306) and nets (e.g., net 304) connecting cell 302 to cell 306. The visual display of the spatially resolved netlist 300 illustrates the layout of an IC, and includes the spatial relationship between cells and nets, the relative sizes and shapes of cells and nets in an IC design layout. Each cell may include linked cell information and each net may include linked net information. In FIG. 3A, the spatially resolved netlist 300 is illustrated as displaying cells (e.g., cell 302 and 306) and nets (e.g., net 304) connecting cell 302 to cell 306. The visual display of the spatially resolved netlist 300 illustrates the layout of an IC, and includes the spatial relationship between cells and nets, the relative sizes and shapes of cells and nets in an IC design layout. Each cell may include linked cell information and each net may include linked net information. FIG. 3B is an example of a transistor-level view of a spatially resolved netlist 350. As described above, each cell typically includes a plurality of transistors, and information about each transistor of a cell may be linked to a cell in the cell information. The spatially resolved netlist may displayed at the transistor level for each cell, as illustrated. In this example, transistors associated with a given cell (e.g., transistor 352) are displayed, and nets are illustrated coupling transistors of different cells (e.g., net 354 coupling to transistor 356). The visual display of the spatially resolved netlist 350 illustrates the layout of an IC, and includes the spatial relationship between transistors and nets, the relative sizes and shapes of transistors and nets in an IC design layout. Each transistor of each cell may include linked cell information and each net may include linked net information.

Figure 4:
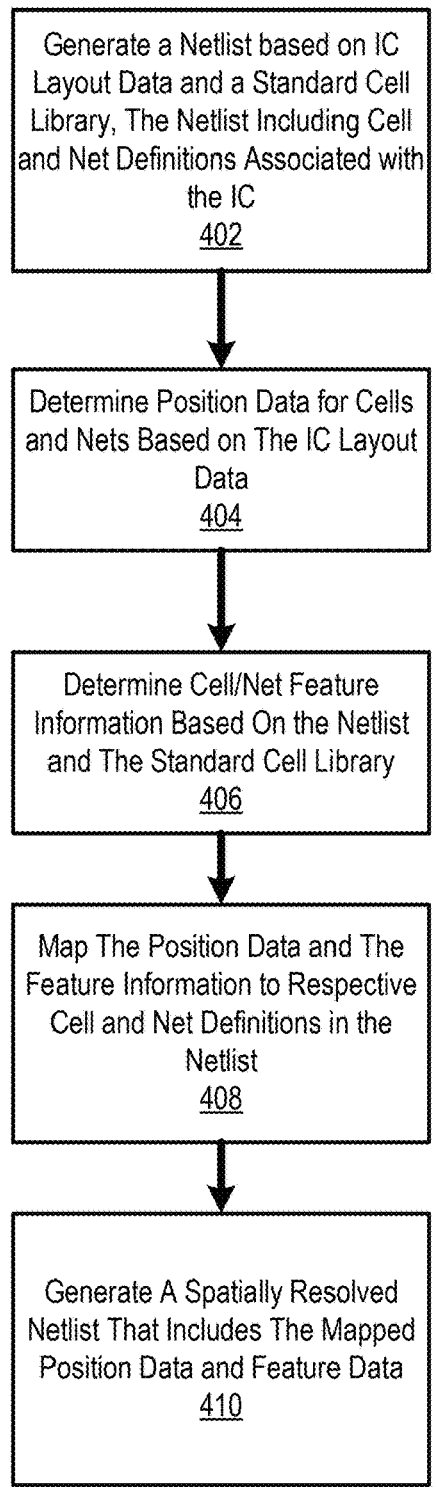
FIG. 4 illustrates a flowchart for generating a pre-fabrication spatially resolved netlist according to one embodiment of the present disclosure.

FIG. 4 illustrates a flowchart 400 for generating a pre-fabrication spatially resolved netlist according to one embodiment of the present disclosure. Operations of this embodiment include generating a netlist based on IC layout data and a standard cell library 402. The netlist generally includes cell and net definitions associated with the IC. Operations of this embodiment also include determining position data for the cells and nets based on the IC layout data 404. Operations of this embodiment also include determining cell and net features based on the netlist and the standard cell library 406. Operations of this embodiment also include mapping the position data and the feature information to respective cell and net definition in the netlist 408. Operations also include generating a spatially resolved netlist that includes the mapped position data and feature data 410.

Figure 5:
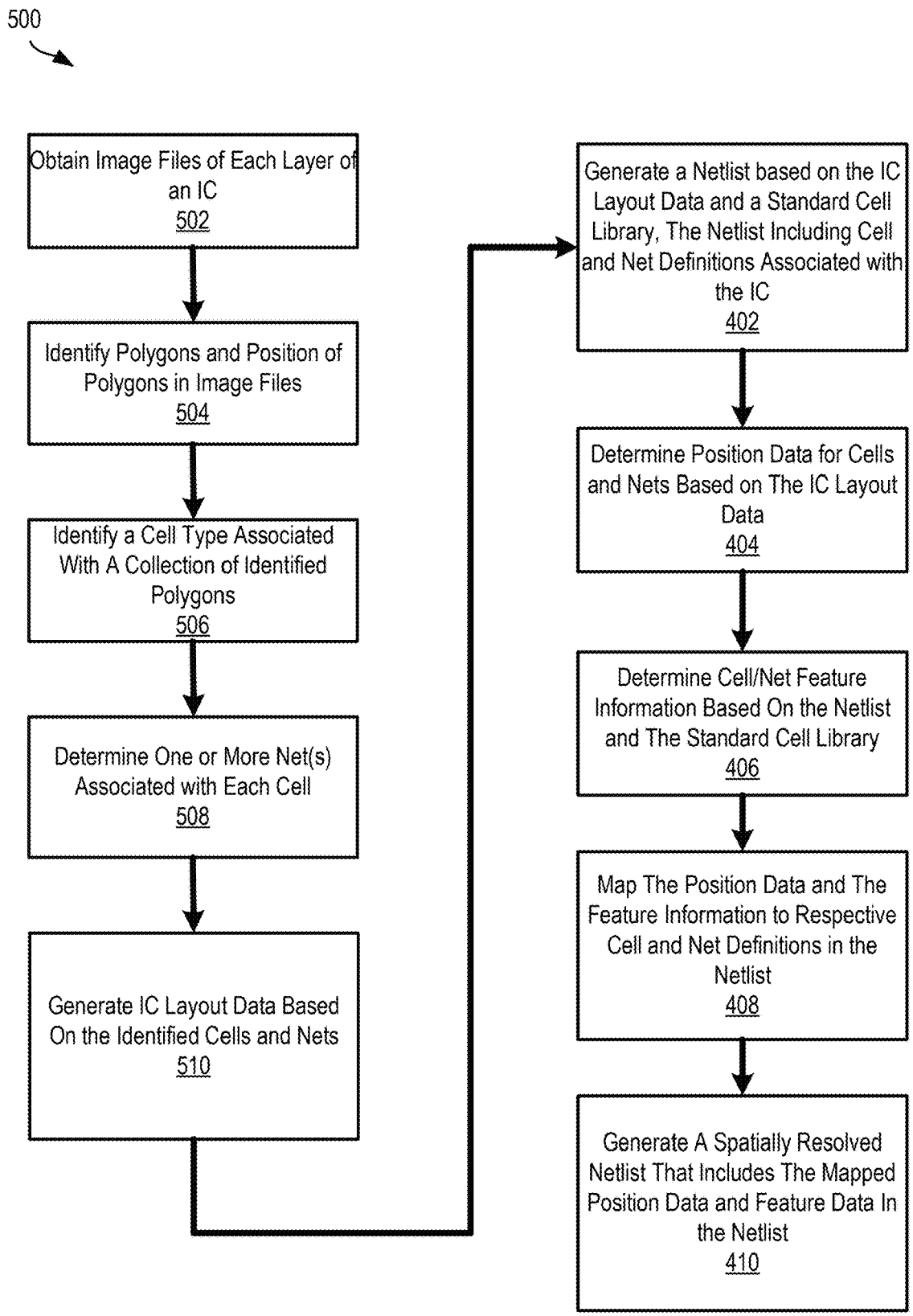
FIG. 5 illustrates a flowchart for generating a post-fabrication spatially resolved netlist according to one embodiment of the present disclosure.

FIG. 5 illustrates a flowchart 500 for generating a post-fabrication spatially resolved netlist. Operations of this embodiment include obtaining image files of each layer of an integrated circuit 502. Such image files may be obtained, for example, using conventional delayering and imaging techniques (e.g., optical, scanning electron microscope, etc.). Operations of this embodiment also include identifying polygons and a location of each polygon in each image file 504. Identifying polygons in a layer image file may include known and/or proprietary polygon extraction techniques such as machine vision techniques. Identified polygons and their respective positions within each layer may be formatted into a standardized database file structure such as a GDS, GDSII, etc. type file structure (and such a file structure may provide shape-based and/or vector-based information about each polygon). Operations of this embodiment also include identifying a cell type associated with a collection of identified polygons 506. For example, cells of an IC may have known shapes corresponding to each cell type, for example, and each cell may have a certain defined collection of polygons in a specified spatial arrangement, which may include spatial arrangements on multiple layers. Identifying cell types from among the identified polygons may include known and/or proprietary standard cell recognition tools to identify shape patterns.

Operations of this embodiment also include determining one or more nets associated with each cell 508. These operations may generally include determining connections between cells by using the identified cell type and position. Operations of this embodiment also include generating IC layout data based on the identified cells and nets 510.

Operations of this embodiment include generating a netlist based on IC layout data and a standard cell library 402. The netlist generally includes cell and net definitions associated with the IC, and the netlist may be formatted in a standard and/or propriety file structure such as a VeriLog file, etc., Operations of this embodiment also include determining position data for the cells and nets based on the IC layout data 404. Operations of this embodiment also include determining cell and net features based on the netlist and the standard cell library 406. Operations of this embodiment also include mapping the position data and the feature information to respective cell and net definition in the netlist 408. Operations also include generating a spatially resolved netlist that includes the mapped position data and feature data 410.

While FIGS. 4 and 5 illustrate various operations according to embodiments, it is to be understood that not all of the operations depicted in FIGS. 4 and/or 5 are necessary for other embodiments. Indeed, it is fully contemplated herein that in other embodiments of the present disclosure, the operations depicted in FIGS. 4 and/or 5, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

Accordingly, the spatially resolved netlist as described herein and takes the spatial geometries of the layout such as wire path length, cell placement location, etc. and merges it into the design netlist thus making it into a new type of design file that is significantly richer that a traditional netlist. A traditional netlist encodes the entirety of the digital logic of the design showing what cells are used and how they are connected, however, no physical or structural information is preserved or integrated. This is the case for both the forward design netlist (pre-fabrication) as well as the recovered design netlist (post-fabrication). For post-fabrication (post-silicon) verification, the spatially resolved netlist can be used for more efficient validation against the "golden" design files by leveraging the geometric and structural information to significantly improve the mapping process between the two designs being compared. Regarding pre-fabrication (pre-silicon) design use cases, the spatially resolved netlist can be used to identify and mitigate layout vulnerabilities generated unknowingly in the design synthesis or place and routing processes. The designer, as a result, can see vulnerabilities sooner in the design process and gain more insight into how automation tools are operating to mitigate the vulnerabilities.

In addition, as described above, the spatially resolved netlist may be considered a cell-level logical netlist that incorporates information about physical structure and shape of cells and nets within a design. Thus, the spatially resolved netlists described herein may bridge the gap between a purely logical representation of a design, such as a traditional netlist or netlist graph, and a purely physical representation of the same design, such as a GDSII or other layout file. The spatially resolved netlist retains logical equivalence to the original netlist and stores additional information about the layout of the design. A logical netlist graph is typically constructed only of AND, OR and NOT gates along with register instances and input/output ports. The spatially resolved netlist described herein retains the original standard cell types as well as the position and bounding boxes of each standard cell instance. Standard cell instance nodes are linked in the graph by wire instance nodes. These wire instance nodes encode both the physical layout information of the nets in the design and the computed electrical properties of these nets.

The spatially resolved netlist described herein can be used for a variety of circuit design, layout and analysis workflows. For example:

Spatial Bus Grouping

The spatially resolved netlist described herein can be used to recover bus groupings of individual wires based on their physical layout. In a chip layout, data busses are often represented as a series of parallel traces with similar beginning and end points. These structures can be recognized based on wire geometry stored with the spatially resolved netlist. The resulting bus grouping information can be fed back into a netlist decompiler or logical equivalence mapping tool (e.g. OneSpin, Cadence Conformal) to speed up the bus grouping process and improve accuracy over purely logical bus grouping.

Module Recovery

Integrated circuit layouts retain some degree of modularity in their physical structure. The module boundaries are blurred during the synthesis and place-and-route processes, but in general cells are more likely to be physically close to other cells from the same module than they are to cells in a different module. This property can be leveraged to create spatially resolved netlist cell grouping techniques that offer improvements over existing module recovery techniques that rely solely on logical structure.

Repeated Submodule Identification

The spatially resolved netlist described herein can be used to search for repeated geometric arrangements of cells that indicate repeated submodules. This type of repeated submodule search is more definitive than current logical submodule search techniques based on subgraph isomorphism. Repeated substructures identified in this manner can be fed back into the netlist decompilation pipeline to improve accuracy. In addition, a fuzzy search for structures similar but not identical to known structures can be used to identify outliers representing artifacts such as imaging/extraction errors or maliciously modified submodules.

Design Verification by Physical Properties

The spatially resolved netlist described herein can be used approximate the physical delay and parasitic characteristics of a fabricated design. Current golden to as-fab comparisons only compare designs in specific domains, such as physical to physical, GDSII to GDSII, or netlist to netlist. Spatially resolved netlists blur the lines between these domains. The knowledge of physical design properties allows for better verification across domains. By estimating physical characteristics based on cell geometry, physical properties such as path delay, power draw and timing can be used for verification of recovered test articles against golden designs in a non-destructive manner.

Design File Recovery Error Detection

Currently, a known limitation in many of the design file recovery tools, such as Pix2net, causes the software to occasionally misidentify gate types based on their width. Using the position information stored in a spatially resolved netlist, the physical footprint of a cell instance can be compared to the expected footprint of the gate type identified by the design recovery tool. If there is a mismatch, this information can be recorded and fed back to design file recovery flow to point out areas where gates were misidentified.

Side Channel Simulation

The spatially resolved netlist described herein may be used for side-channel simulation. Physical characteristics of real-world designs can cause certain unintended side-channel effects, such as leakage of information over power draw or EM emissions. Using spatially resolved netlists, structures correlated with side-channel phenomena can be identified. The physical properties of these structures can then be simulated to model the side channel effects and determine the causes of these effects. By comparing predicted to measured side-channel properties, researchers can improve the understanding of the physical causes of side channel effects.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

Any of the operations described herein may be implemented in a system that includes one or more non-transitory storage devices having stored therein, individually or in combination, instructions that when executed by circuitry perform the operations. "Circuitry", as used in any embodiment herein, may comprise, for example, singly or in any combination, hardwired circuitry, programmable circuitry such as processors comprising one or more individual instruction processing cores, state machine circuitry, and/or firmware that stores instructions executed by programmable circuitry and/or future computing circuitry including, for example, massive parallelism, analog or quantum computing, hardware embodiments of accelerators such as neural net processors and non-silicon implementations of the above. The circuitry may, collectively or individually, be embodied as circuitry that forms part of a larger system, for example, an integrated circuit (IC), system on-chip (SoC), application-specific integrated circuit (ASIC), programmable logic devices (PLD), digital signal processors (DSP), field programmable gate array (FPGA), logic gates, registers, semiconductor device, chips, microchips, chip sets, etc.

The storage device includes any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software executed by a programmable control device. Also, it is intended that operations described herein may be distributed across a plurality of physical devices, such as processing structures at more than one different physical location.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

What is claimed:

1. A method for generating a spatially resolved netlist, comprising:
    generating a netlist based on integrated circuit (IC) layout data and standard cell library data, the netlist including cell and net definitions associated with the IC;
    determining position data for respective cells and nets based on the IC layout data;
    mapping the position data to respective cell and net definitions in the netlist; and
    generating a spatially resolved netlist that includes the mapped position data to respective cell and net definitions.

2. The method of claim 1, further comprising determining feature information associated with respective cells and nets and mapping the feature information to respective cell and net definitions in the netlist.

3. The method of claim 2, wherein the feature information is selected from at least one of cell size data, net size data, cell width data, net width data, cell shape data, net shape data, cell electrical characteristics data, or net electrical characteristics data.

4. The method of claim 1, wherein the IC layout data is the original IC layout data generated at a pre-fabrication stage of an IC design process.

5. The method of claim 1, further comprising identifying polygons in image files of each layer of the IC; identifying a cell type for a collection of identified polygons; and identifying one or more nets associated with each cell.

6. The method of claim 5, further comprising generating the IC layout data based on the identified cells and nets; wherein the IC layout data represents IC information at a post-fabrication stage of an IC design process.

7. A non-transitory storage device that includes machine-readable instructions that, when executed by one or more processors, cause the one or more processors to perform operations, comprising:
    generate a netlist based on integrated circuit (IC) layout data and standard cell library data, the netlist including cell and net definitions associated with the IC;
    determine position data for respective cells and nets based on the IC layout data;
    map the position data to respective cell and net definitions in the netlist; and
    generate a spatially resolved netlist that includes the mapped position data to respective cell and net definitions.

8. The non-transitory storage device of claim 7, wherein the machine-readable instructions that, when executed by one or more processors, cause the one or more processors to perform operations, comprising:
    determine feature information associated with respective cells and nets and mapping the feature information to respective cell and net definitions in the netlist.

9. The non-transitory storage device of claim 8, wherein the feature information is selected from at least one of cell size data, net size data, cell width data, net width data, cell shape data, net shape data, cell electrical characteristics data, or net electrical characteristics data.

10. The non-transitory storage device of claim 7, wherein the IC layout data is the original IC layout data generated at a pre-fabrication stage of an IC design process.

11. The non-transitory storage device of claim 7, wherein the machine-readable instructions that, when executed by one or more processors, cause the one or more processors to perform operations, comprising:
    identify polygons in image files of each layer of the IC;
    identify a cell type for a collection of identified polygons; and
    identify one or more nets associated with each cell.

12. The non-transitory storage device of claim 11, wherein the machine-readable instructions that, when executed by one or more processors, cause the one or more processors to perform operations, comprising:

generate the IC layout data based on the identified cells and nets; wherein the IC layout data represents IC information at a post-fabrication stage of an IC design process.

13. A system to generate a spatially resolved netlist, comprising:
  netlist extraction circuitry to generate a netlist based on integrated circuit (IC) layout data and standard cell library data, the netlist including cell and net definitions associated with the IC;
  cell and net position determination circuitry to determine position data for respective cells and nets based on the IC layout data;
  cell and net mapping circuitry to map the position data to respective cell and net definitions in the netlist; and
  spatially resolved netlist generation circuitry to generate a spatially resolved netlist that includes the mapped position data to respective cell and net definitions.

14. The system of claim 13, wherein the cell and net mapping circuitry also to determine feature information associated with respective cells and nets and map the feature information to respective cell and net definitions in the netlist.

15. The system of claim 14, wherein the feature information is selected from at least one of cell size data, net size data, cell width data, net width data, cell shape data, net shape data, cell electrical characteristics data, or net electrical characteristics data.

16. The system of claim 13, wherein the IC layout data is the original IC layout data generated at a pre-fabrication stage of an IC design process.

17. The system of claim 13, further comprising:
  polygon extraction circuitry to identify polygons in image files of each layer of the IC and to identify a cell type for a collection of identified polygons and to identify one or more nets associated with each cell.

18. The system of claim 17, further comprising:
  IC layout data generation circuitry to generate the IC layout data based on the identified cells and nets; wherein the IC layout data represents IC information at a post-fabrication stage of an IC design process.

* * * * *